(12) United States Patent
Baheti et al.

(10) Patent No.: US 9,047,540 B2
(45) Date of Patent: Jun. 2, 2015

(54) TRELLIS BASED WORD DECODER WITH REVERSE PASS

(71) Applicant: QUALCOMM Incorporated, San Diego, CA (US)

(72) Inventors: Pawan Kumar Baheti, Bangalore (IN); Kishor K. Barman, Bangalore (IN); Raj Kumar Krishna Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/829,960

(22) Filed: Mar. 14, 2013

(65) Prior Publication Data

US 2014/0023273 A1 Jan. 23, 2014

Related U.S. Application Data

(60) Provisional application No. 61/673,606, filed on Jul. 19, 2012.

(51) Int. Cl.
G06K 9/34 (2006.01)
G06K 9/72 (2006.01)

(52) U.S. Cl.
CPC ........................................ *G06K 9/72* (2013.01)

(58) Field of Classification Search
USPC ......... 382/229, 177, 290, 181, 305, 209, 159, 382/182, 155, 226, 242, 233, 232, 310; 375/265, 262, 341; 714/795; 358/1.15, 358/3.28; 235/375, 494; 704/254, 256, 704/256.7
See application file for complete search history.

(56) References Cited

U.S. PATENT DOCUMENTS

| | | | |
|---|---|---|---|
| 3,710,321 | A | 1/1973 | Rubenstein |
| 4,654,875 | A | 3/1987 | Srihari et al. |
| 5,321,768 | A | 6/1994 | Fenrich et al. |
| 5,459,739 | A | 10/1995 | Handley et al. |
| 5,465,304 | A | 11/1995 | Cullen et al. |
| 5,519,786 | A | 5/1996 | Courtney et al. |

(Continued)

FOREIGN PATENT DOCUMENTS

| | | | |
|---|---|---|---|
| EP | 1146478 A2 | 10/2001 | |
| EP | 1840798 A1 | 10/2007 | |

(Continued)

OTHER PUBLICATIONS

"4.1 Points and patches" In: Szeliski Richard: "Computer Vision—Algorithms and Applications", 2011, Springer-Verlag, London, XP002696110, p. 195, ISBN: 978-1-84882-934-3.

(Continued)

*Primary Examiner* — Anh Do
(74) *Attorney, Agent, or Firm* — Silicon Valley Patent Group LLP

(57) ABSTRACT

Systems, apparatuses, and methods to relate images of words to a list of words are provided. A trellis based word decoder analyses a set of OCR characters and probabilities using a forward pass across a forward trellis and a reverse pass across a reverse trellis. Multiple paths may result, however, the most likely path from the trellises has the highest probability with valid links. A valid link is determined from the trellis by some dictionary word traversing the link. The most likely path is compared with a list of words to find the word closest to the most.

52 Claims, 12 Drawing Sheets

(56) References Cited

U.S. PATENT DOCUMENTS

| | | | |
|---|---|---|---|
| 5,563,403 A | 10/1996 | Bessho et al. | |
| 5,633,954 A | 5/1997 | Gupta et al. | |
| 5,751,850 A | 5/1998 | Rindtorff | |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,092,045 A * | 7/2000 | Stubley et al. | 704/254 |
| 6,266,439 B1 | 7/2001 | Pollard et al. | |
| 6,393,443 B1 | 5/2002 | Rubin et al. | |
| 6,473,517 B1 | 10/2002 | Tyan et al. | |
| 6,674,919 B1 | 1/2004 | Ma et al. | |
| 6,678,415 B1 | 1/2004 | Popat et al. | |
| 6,687,421 B1 | 2/2004 | Navon | |
| 6,738,512 B1 | 5/2004 | Chen et al. | |
| 6,954,795 B2 * | 10/2005 | Takao et al. | 709/231 |
| 7,110,621 B1 * | 9/2006 | Greene et al. | 382/310 |
| 7,142,727 B2 | 11/2006 | Notovitz et al. | |
| 7,263,223 B2 | 8/2007 | Irwin | |
| 7,333,676 B2 | 2/2008 | Myers et al. | |
| 7,403,661 B2 | 7/2008 | Curry et al. | |
| 7,450,268 B2 | 11/2008 | Martinez et al. | |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,961,948 B2 | 6/2011 | Katsuyama | |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 8,285,082 B2 * | 10/2012 | Heck | 382/305 |
| 8,306,325 B2 | 11/2012 | Chang | |
| 8,417,059 B2 | 4/2013 | Yamada | |
| 8,542,926 B2 | 9/2013 | Panjwani et al. | |
| 8,644,646 B2 * | 2/2014 | Heck | 382/305 |
| 2003/0026482 A1 | 2/2003 | Dance | |
| 2003/0099395 A1 | 5/2003 | Wang et al. | |
| 2003/0215137 A1 | 11/2003 | Wnek | |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0039605 A1 | 2/2006 | Koga | |
| 2006/0215231 A1 | 9/2006 | Borrey et al. | |
| 2006/0291692 A1 | 12/2006 | Nakao et al. | |
| 2007/0116360 A1 | 5/2007 | Jung et al. | |
| 2007/0217676 A1 | 9/2007 | Grauman et al. | |
| 2008/0008386 A1 | 1/2008 | Anisimovich et al. | |
| 2008/0063273 A1 | 3/2008 | Shimodaira | |
| 2008/0112614 A1 | 5/2008 | Fluck et al. | |
| 2009/0060335 A1 | 3/2009 | Rodriguez Serrano et al. | |
| 2009/0202152 A1 | 8/2009 | Takebe et al. | |
| 2009/0232358 A1 | 9/2009 | Cross | |
| 2009/0252437 A1 | 10/2009 | Li et al. | |
| 2009/0316991 A1 | 12/2009 | Geva et al. | |
| 2009/0317003 A1 | 12/2009 | Heilper et al. | |
| 2010/0049711 A1 | 2/2010 | Singh et al. | |
| 2010/0067826 A1 | 3/2010 | Honsinger et al. | |
| 2010/0080462 A1 | 4/2010 | Miljanic et al. | |
| 2010/0128131 A1 | 5/2010 | Tenchio et al. | |
| 2010/0141788 A1 | 6/2010 | Hwang et al. | |
| 2010/0144291 A1 | 6/2010 | Stylianou et al. | |
| 2010/0172575 A1 | 7/2010 | Lukac et al. | |
| 2010/0195933 A1 | 8/2010 | Nafarieh | |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 | 10/2010 | Khorsheed et al. | |
| 2010/0296729 A1 | 11/2010 | Mossakowski | |
| 2011/0052094 A1 | 3/2011 | Gao et al. | |
| 2011/0081083 A1 | 4/2011 | Lee et al. | |
| 2011/0188756 A1 | 8/2011 | Lee et al. | |
| 2011/0215147 A1 | 9/2011 | Goncalves et al. | |
| 2011/0222768 A1 | 9/2011 | Galic et al. | |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1 | 11/2011 | Showering et al. | |
| 2012/0051642 A1 | 3/2012 | Berrani et al. | |
| 2012/0066213 A1 | 3/2012 | Ohguro | |
| 2012/0092329 A1 | 4/2012 | Koo et al. | |
| 2012/0114245 A1 | 5/2012 | Lakshmanan et al. | |
| 2012/0155754 A1 | 6/2012 | Chen et al. | |
| 2013/0001295 A1 | 1/2013 | Goncalves | |
| 2013/0058575 A1 | 3/2013 | Koo et al. | |
| 2013/0129216 A1 | 5/2013 | Tsai et al. | |
| 2013/0194448 A1 | 8/2013 | Baheti et al. | |
| 2013/0195315 A1 | 8/2013 | Baheti et al. | |
| 2013/0195360 A1 | 8/2013 | Krishna Kumar et al. | |
| 2013/0195376 A1 | 8/2013 | Baheti et al. | |
| 2013/0308860 A1 | 11/2013 | Mainali et al. | |
| 2014/0003709 A1 | 1/2014 | Ranganathan et al. | |
| 2014/0022406 A1 | 1/2014 | Baheti et al. | |
| 2014/0023270 A1 | 1/2014 | Baheti et al. | |
| 2014/0023271 A1 | 1/2014 | Baheti et al. | |
| 2014/0023274 A1 | 1/2014 | Barman et al. | |
| 2014/0023275 A1 | 1/2014 | Krishna Kumar et al. | |
| 2014/0023278 A1 | 1/2014 | Krishna Kumar et al. | |
| 2014/0161365 A1 | 6/2014 | Acharya | |
| 2014/0168478 A1 | 6/2014 | Baheti et al. | |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Agrawal, et al., "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-8400-329-3.

Chaudhuri et al., "Skew Angle Detection of Digitized Indian Script Documents", IEEE Transactions on Pattern Analysis and Machine Intelligence, Feb. 1997, pp. 182-186, vol. 19, No. 2.

Chen, et al.,, "Detecting and reading text in natural scenes," IEEE Computer Society Conference on Computer Vision and Pattern Recognition (CVPR'04), 2004, pp. 1-8.

Chen H., et al., "Robust Text Detection in Natural Images With Edge-Enhanced Maximally Stable Extremal Regions," believed to be published in IEEE International Conference on Image Processing (ICIP), Sep. 2011, pp. 1-4.

Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Chowdhury A.R., et al., "Text Detection of Two Major Indian Scripts in Natural Scene Images", Sep. 22, 2011 (Sep. 2, 2011), Camera-Based Document Analysis and Recognition, Springer Berlin Heidelberg, pp. 42-57, XP019175802, ISBN: 978-3-642-29363-4.

Dlagnekov L., et al., "Detecting and Reading Text in Natural Scenes," Oct. 2004, pp. 1-22.

Elgammal A.M., et al., "Techniques for Language Identification for Hybrid Arabic-English Document Images," believed to be published

(56) References Cited

OTHER PUBLICATIONS in 2001 in Proceedings of IEEE 6th International Conference on Document Analysis and Recognition, pp. 1-5.
Epshtein B., et al.,"Detecting text in natural scenes with stroke width transform", 2010 IEEE Conference on Computer Vision and Pattern Recognition (CVPR), Jun. 13-18, 2010, San Francisco, CA, USA, IEEE, Piscataway, NJ, USA, Jun. 13, 2010, pp. 2963-2970, XP031725870, ISBN: 978-1-4244-6984-0.
Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.
Holmstrom L., et al., "Neural and Statistical Classifiers—Taxonomy and Two Case Studies," IEEE Transactions on Neural Networks, Jan. 1997, pp. 5-17, vol. 8 (1).
Jain A.K., et al., "Automatic Text Location in Images and Video Frames," believed to be published In Proceedings of Fourteenth International Conference on Pattern Recognition, vol. 2, Aug. 1998, pp. 1497-1499.
Jain, et al., "Automatic text location in images and video frames", Pattern Recognition, 1998, pp. 2055-2076, vol. 31, No. 12.
Jayadevan, et al., "Offline Recognition of Devanagari Script: A Survey", IEEE Transactions on Systems, Man, and Cybernetics—Part C: Applications and Reviews, 2010, pp. 1-15.
Kapoor et al., "Skew angle detection of a cursive handwritten Devanagari script character image", Indian Institute of Science, May-Aug. 2002, pp. 161-175.
Lee, et al., "A new methodology for gray-scale character segmentation and recognition," IEEE Transactions on Pattern Analysis and Machine Intelligence, Oct. 1996, pp. 1045-1050, vol. 18, No. 10.
Li et al., "Automatic Text Detection and Tracking in a Digital Video", IEEE Transactions on Image Processing, Jan. 2000, pp. 147-156, vol. 9 No. 1.
Machine Learning, retrieved from http://en.wikipedia.org/wiki/Machine_learning, May 7, 2012, pp. 1-8.
Matas, et al., "Robust Wide Baseline Stereo from Maximally Stable Extremal Regions", 2002, pp. 384-393.
Mikulik, et al., "Construction of Precise Local Affine Frames," Center for Machine Perception, Czech Technical University in Prague, Czech Republic, pp. 1-5, Abstract and second paragraph of Section 1; Algorithms 1 & 2 of Section 2 and Section 4.
Moving Average, retrieved from http://en.wikipedia.org/wiki/Moving_average, Jan. 23, 2013, pp. 1-5.
Nister D., et al., "Linear Time Maximally Stable Extremal Regions," ECCV, 2008, Part II, LNCS 5303, pp. 183-196, published by Springer-Verlag Berlin Heidelberg.
Pal, et al., "Indian script character recognition: a survey", Pattern Recognition Society, Published by Elsevier Ltd, 2004, pp. 1887-1899.
Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.
Pardo M., et al., "Learning From Data: A Tutorial With Emphasis on Modern Pattern Recognition Methods," IEEE Sensors Journal, Jun. 2002, pp. 203-217, vol. 2 (3).
Park, J-M. et al., "Fast Connected Component Labeling Algorithm Using a Divide and Conquer Technique," believed to be published in Matrix (2000), vol. 4 (1), pp. 4-7, Publisher: Elsevier Ltd.
Renold M., "Detecting and Reading Text in Natural Scenes," Master's Thesis, May 2008, pp. 1-59.
Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.
Shin H., et al., "Application of Floyd-Warshall Labelling Technique: Identification of Connected Pixel Components in Binary Image," Kangweon-Kyungki Math. Jour. 14(2006), No. 1, pp. 47-55.
Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR.2011.28 ISBN: 978-1-45-771350-7.
Vedaldi A., "An Implementation of Multi-Dimensional Maximally Stable Extremal Regions" Feb. 7, 2007, pp. 1-7.
VLFeat—Tutorials—MSER, retrieved from http://www.vlfeat.org/overview/mser.html, Apr. 30, 2012, pp. 1-2.
Wu V., et al., "TextFinder: An Automatic System to Detect and Recognize Text in Images", IEEE Transactions on Pattern Analysis and Machine Intelligence, vol. 21. No. 11, Nov. 1, 1999, pp. 1224-1229, XP055068381.
Chaudhury S (Eds.): OCR Technical Report for the project "Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].
Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.
Ray A.K et al., "Information Technology—Principles and Applications". 2004. Prentice-Hall of India Private Limited. New Delhi! XP002712579, ISBN: 81-203-2184-7, pp. 529-531.
Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.
Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.
Chaudhuri B.B., et al., "An OCR system to read two Indian language scripts: Bangla and Devnagari (Hindi)", Proceedings of the 4th International Conference on Document Analysis and Recognition. (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.
Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.
Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514, ISBN: 978-1-4244-1630-1 abstract Section 2. Multi-resoltuion MSER.
International Search Report and Written Opinion—PCT/US2013/047572—ISA/EPO—Oct. 22, 2013.
Minoru M., Ed., "Character Recognition", Aug. 2010, Sciyo, XP002715748, ISBN: 978-953-307-105-3 pp. 91-95, p. 92, secton "7.3 Baseline Detection Process".
Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc e on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.
Premaratne H L et al: "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.
Senda S et al: "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.
Senk V et al: "A new bidirectional algorithm for decoding trellis codes," Eurocon' 2001, Trends in Communications, International

(56) References Cited

OTHER PUBLICATIONS

Conference on Jul. 4-7, 2001, Piscataway, NJ, USA, IEEE, Jul. 4, 2001, pp. 34-36, vol. I, XP032155513, DOI: :10.1109/EURCON.2001.937757 ISBN: 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC.1995.538004 ISBN: 978-0-7803-2559-3 the whole document.

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

\* cited by examiner

List of words 202
(e.g., {BAD, CAB, DAD, BED})

| Unicode | Char ID | Letter |
|---|---|---|
| U+0041 | 1 | A |
| U+0042 | 2 | B |
| U+0043 | 3 | C |
| U+0044 | 4 | D |
| U+0045 | 5 | E |

| Unicode | Char ID | Letter |
|---|---|---|
| U+0924 | 6 | त |
| U+092C | 7 | ब |
| U+092D | 8 | भ |
| U+0930 | 9 | र |
| U+093E | 10 | ा |
| U+0941 | 11 | ु |

Set of characters 124 with corresponding probabilities

| 1st character | 2nd character | 3rd character |
|---|---|---|
| $B_1$   0.6 | $A_2$   0.4 | $B_3$   0.3 |
| $D_1$   0.4 | $D_2$   0.6 | $D_3$   0.7 |

| List of words 202 | List of words 202 | List of words 202 |
|---|---|---|
| BAD = 1 | BAD = 2 | BAD = 3 |
| CAB = 0 | CAB = 1 | CAB = 1 |
| DAD = 0 | DAD = 1 | DAD = 2 |
| BED = 1 | BED = 1 | BED = 2 |

# TRELLIS BASED WORD DECODER WITH REVERSE PASS

CROSS-REFERENCE TO RELATED APPLICATIONS

This application claims priority from U.S. Provisional Application No. 61/673,606, filed on Jul. 19, 2012, titled "Trellis based word decoder with reverse pass" and which is incorporated herein by reference in its entirety.

This application is related to U.S. Provisional Application No. 61/677,291, filed on Jul. 30, 2012, titled "Method of handling complex variants of words through prefix-tree based decoding for Devanagiri OCR" and which is incorporated herein by reference in its entirety.

This application is related to U.S. application Ser. No. 13/828,060, filed on Mar. 14, 2013, titled "Method of handling complex variants of words through prefix-tree based decoding for Devanagiri OCR" and which is incorporated herein by reference in its entirety.

BACKGROUND

1. Field

This disclosure generally relates to techniques for recognizing text from captured images, and specifically for deciding on a word based on a trellis structure and possible characters decisions resulting from optical character recognition.

2. Background

Image and text recognition is providing important functionality to today's mobile devices. In particular, a user may travel to a country where the national language is unknown to the user, and then may translate signs, menus, or other text included in a camera image into the user's home language (i.e., from a first language to a second language). With some systems, a user may access additional information once the text in the image is recognized.

Some languages are especially difficult to perform word recognition based on the wide range of character combinations, a large dictionary and limited power. What is needed is a means for increasing efficiency of optical word recognition, more quickly determining a valid word, and reducing power consumption.

SUMMARY

Systems, apparatuses, and methods disclosed herein provide for efficient and accurate recognition of text in images.

According to some aspects, disclosed is a method to relate images of words to a list of words in an optical character recognition (OCR) system, the method comprising: receiving a plurality of OCR characters corresponding to an image of a word, wherein the plurality of OCR characters are from an OCR system; determining a most likely (ML) path based on the plurality of OCR characters applied to a loaded forward trellis and a loaded reverse trellis, thereby forming a decoded word; and displaying the decoded word.

According to some aspects, disclosed is a mobile device to relate images of words to a list of words in an optical character recognition (OCR) system, the mobile device comprising: a camera configured to capture an image of a word; a processor coupled to the camera, the processor comprising code to: receive a plurality of OCR characters corresponding to the image of the word; and determine a most likely (ML) path based on the plurality of OCR characters applied to a loaded forward trellis and a loaded reverse trellis, thereby forming a decoded word; and a display coupled to the processor and configured to display the decoded word.

According to some aspects, disclosed is a mobile device to relate images of words to a list of words in an optical character recognition (OCR) system, the mobile device comprising: means for receiving a plurality of OCR characters corresponding to an image of a word, wherein the plurality of OCR characters are from an OCR system; means for determining a most likely (ML) path based on the plurality of OCR characters applied to a loaded forward trellis and a loaded reverse trellis, thereby forming a decoded word; and means for displaying the decoded word.

According to some aspects, disclosed is a device to relate images of words to a list of words in an optical character recognition (OCR) system, the device comprising a processor and a memory wherein the memory includes software instructions to: receive a plurality of OCR characters corresponding to an image of a word, wherein the plurality of OCR characters are from an OCR system; determine a most likely (ML) path based on the plurality of OCR characters applied to a loaded forward trellis and a loaded reverse trellis, thereby forming a decoded word; and display the decoded word.

According to some aspects, disclosed is a non-transitory computer-readable storage medium including program code stored thereon, for a method to relate images of words to a list of words in an optical character recognition (OCR) system, comprising program code to: receive a plurality of OCR characters corresponding to an image of a word, wherein the plurality of OCR characters are from an OCR system; determine a most likely (ML) path based on the plurality of OCR characters applied to a loaded forward trellis and a loaded reverse trellis, thereby forming a decoded word; and display the decoded word.

According to some aspects, disclosed is a method to prepare a forward trellis and a reverse trellis in an optical character recognition (OCR) system, the method comprising: accessing a list of words; loading the forward trellis using the list of words to form a loaded forward trellis; and loading the reverse trellis using the list of words to form a loaded reverse trellis.

According to some aspects, disclosed is a server to prepare a forward trellis and a reverse trellis in an optical character recognition (OCR) system, the server comprising: a list of words; the forward trellis; the reverse trellis; a processor coupled to receive the list of words and coupled to load the forward trellis and the reverse trellis, wherein the processor comprises program code to: access the list of words; load the forward trellis using the list of words to form a loaded forward trellis; and load the reverse trellis using the list of words to form a loaded reverse trellis.

According to some aspects, disclosed is a mobile device to relate images of words to a list of words in an optical character recognition (OCR) system, the mobile device comprising: means for accessing the list of words; means for loading a forward trellis using the list of words to form a loaded forward trellis; and means for loading a reverse trellis using the list of words to form a loaded reverse trellis.

According to some aspects, disclosed is a server to prepare a forward trellis and a reverse trellis in an optical character recognition (OCR) system, the server comprising a processor and a memory, wherein the memory includes software instructions to: access a list of words; load the forward trellis using the list of words to form a loaded forward trellis; and load the reverse trellis using the list of words to form a loaded reverse trellis.

According to some aspects, disclosed is a non-transitory computer-readable storage medium including program code stored thereon for a server to prepare a forward trellis and a reverse trellis, the non-transitory computer-readable storage medium comprising program code to: access a list of words; load the forward trellis using the list of words to form a loaded forward trellis; and load the reverse trellis using the list of words to form a loaded reverse trellis.

DETAILED DESCRIPTION

The features and advantages of the disclosed method and apparatus will become more apparent to those skilled in the art after considering the following detailed description in connection with the accompanying drawing.

After processing an image through text detection and Optical Character Recognition (OCR), a word decoder (that leverages a dictionary or list of words) is used to determine a most likely valid word. The importance of an efficient word decoder increases with the increase of dictionary size. Systems and techniques described herein provide a trellis based word decoder that efficiently searches through a list of words to find a valid word. The techniques may also include an additional reverse pass, where the list of words is processed in a reverse order to create the trellis. The forward pass and reverse pass results may then be combined to obtain the final output.

Figure 1:
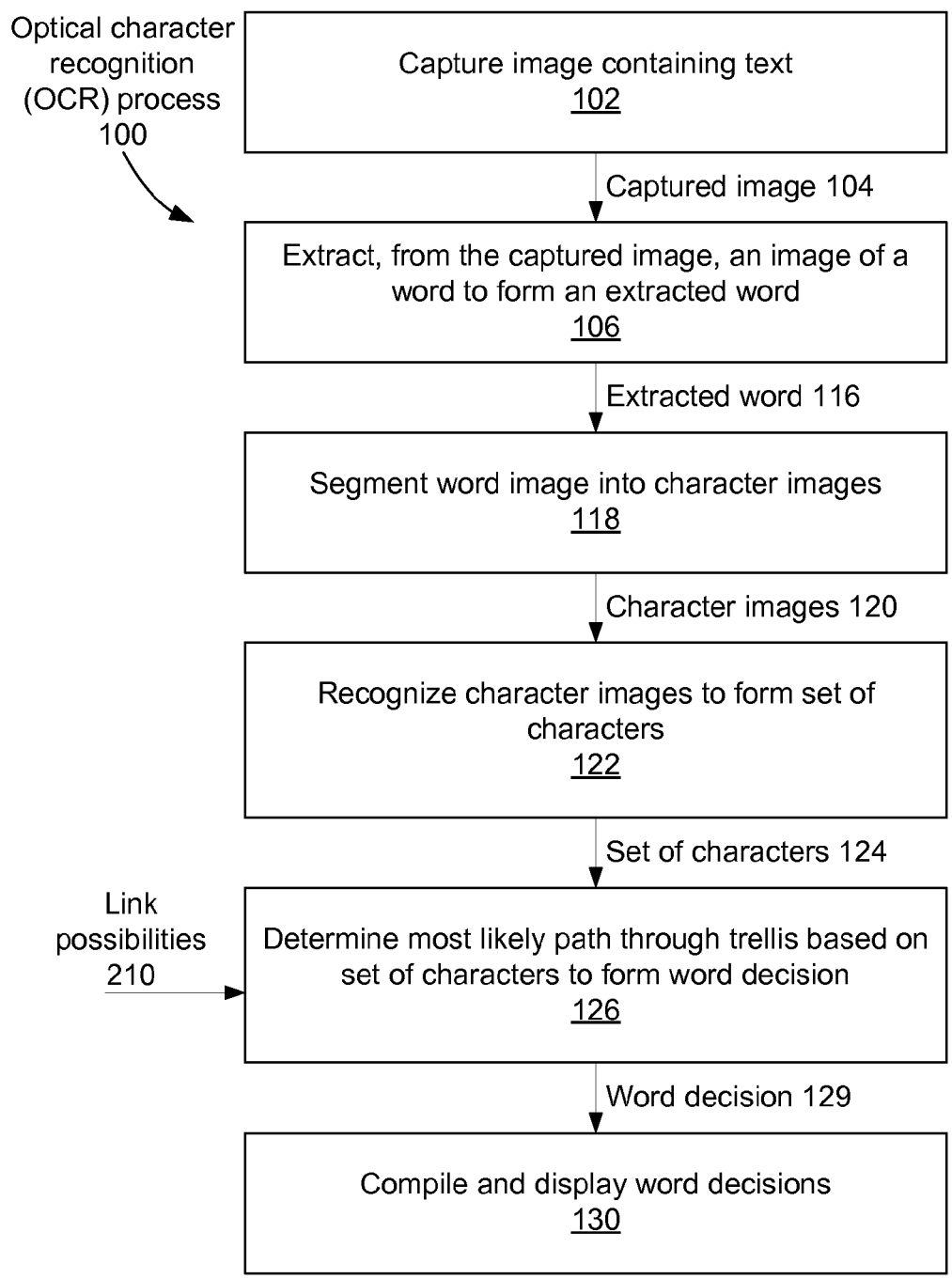
FIG. 1 shows an optical character recognition (OCR) process, in accordance with embodiments of the invention.

FIG. 1 shows an optical character recognition (OCR) process 100, in accordance with embodiments of the invention. At 102, a mobile device captures an image containing text to form a captured image 104. At 106, a processor in the mobile device extracts, from the captured image 104, an image of a word to form an extracted word 116. The processor may extract the word by de-skewing and forming a rectangular box encompassing pixels that are connected together. Pixels connected together form a connected component. At 118, the processor segments the extracted word 116 into a sequence of character images 120. At 122, the processor recognizes the character images 120 to form a set of characters 124. For example, an extracted word 116 may contain the image ( भारत ), which the processor breaks down into the set of characters 124, such as {' भा ', ' र ', ' त '}, or {' भ ', ' ा ', ' र ', ' त '}.

Figures 5, 6:
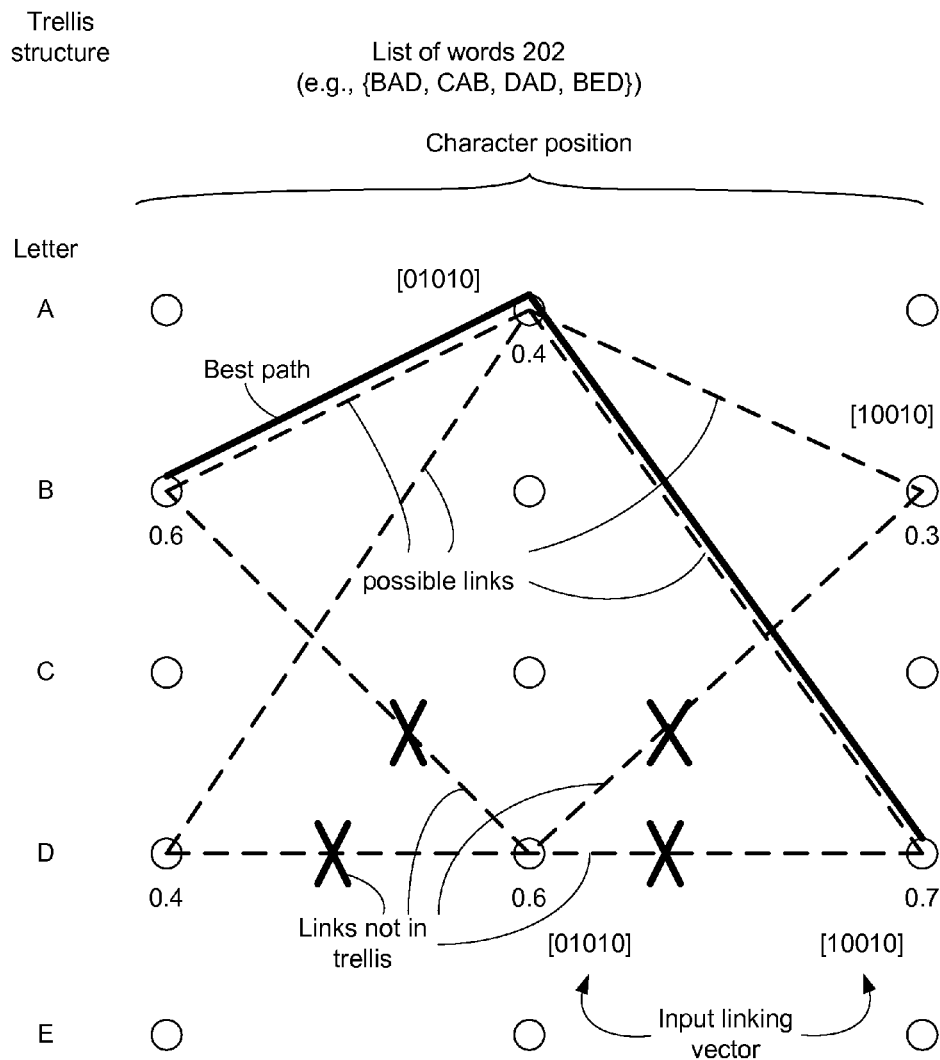
FIGS. 5 and 6 illustrate word decoding based on OCR character probabilities, in accordance with embodiments of the invention.

At 126, some embodiments begin with the processor determining a most likely path through a trellis based on the set of characters 124. The processor then forms a word decision 129. The set of characters 124 may be represented by a plurality of possible characters for each position with a corresponding probability (as shown in FIG. 5). Link possibilities 210 are provided as an input signal to the processor performing the trellis decoding. At 130, the word decisions 129 are compiled and displayed.

Figures 2, 3:
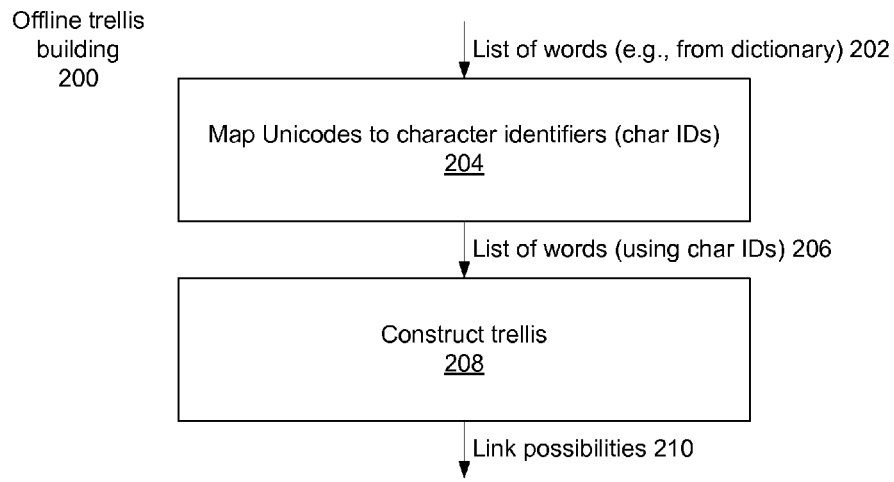
FIGS. 2 and 3 show mapping Unicodes to character identifiers (char IDs), in accordance with embodiments of the invention.

FIGS. 2 and 3 show mapping Unicodes to character identifiers (char IDs), in accordance with embodiments of the invention. In FIG. 2, a method 200 for offline building of a trellis structure is shown. A list of words 202 (e.g., from a dictionary or other list of words) is provided to 204. At 204, a processor optionally converts and maps Unicode to character identifiers (hereinafter, char IDs) to form a list of words 206. Some character sets are identified with ASCII or Unicode. There is great benefit in terms of size savings to map character sets that are identified with a multiple-byte Unicode (as opposed to character sets identified with ASCII or a single Unicode). More complicated character sets use one, two or three Unicodes in a string for various characters in the set. For example, some Unicodes (e.g., U+093E for ' ा ', U+941 for ' ु ') are combined to place accent marks to one side of a base character to form a new character (e.g., U+0923 for ' त ' and U+093E for ' ा ' are combined to form ' ता '). At 208, the processor constructs a trellis with the list of words 206 to form link possibilities 210. The list of words 202 (without mapping) and list of words 206 (after mapping) are used interchangeable below. The processor may be in the mobile device or alternatively in a remote server.

In FIG. 3, a table shows five Unicodes mapping Roman letter into char IDs. The table also shows six Unicodes mapping Devanagari characters (also referred to as Nāgarī characters, which are used in the Hindi language) into additional char IDs. The char IDs require less memory than the original Unicodes. Each set of Unicode-to-Char ID mapping identifies one character or letter in the example alphabet. In this case, the lists of words 202 and 206 contain a four word dictionary with words BAD, CAB, DAD and BED. The list of words 202 (using Unicodes U+0041 to U+0045) and list of words 206 (using char IDs 1 to 5) reference the five Roman letters 'A' through 'E'. The list of words 202 also contains Unicodes U+0924, U+092C, U+092D, U+0930, U+093E and U+0941 and list of words 206 contain char IDs 6 to 11. Lists of words 202 and 206 may contain just Roman letter, just Devanagari character or both Roman letters and Devanagari characters. Example below use either Roman letters or Devanagari characters for convenience.

Figure 4:
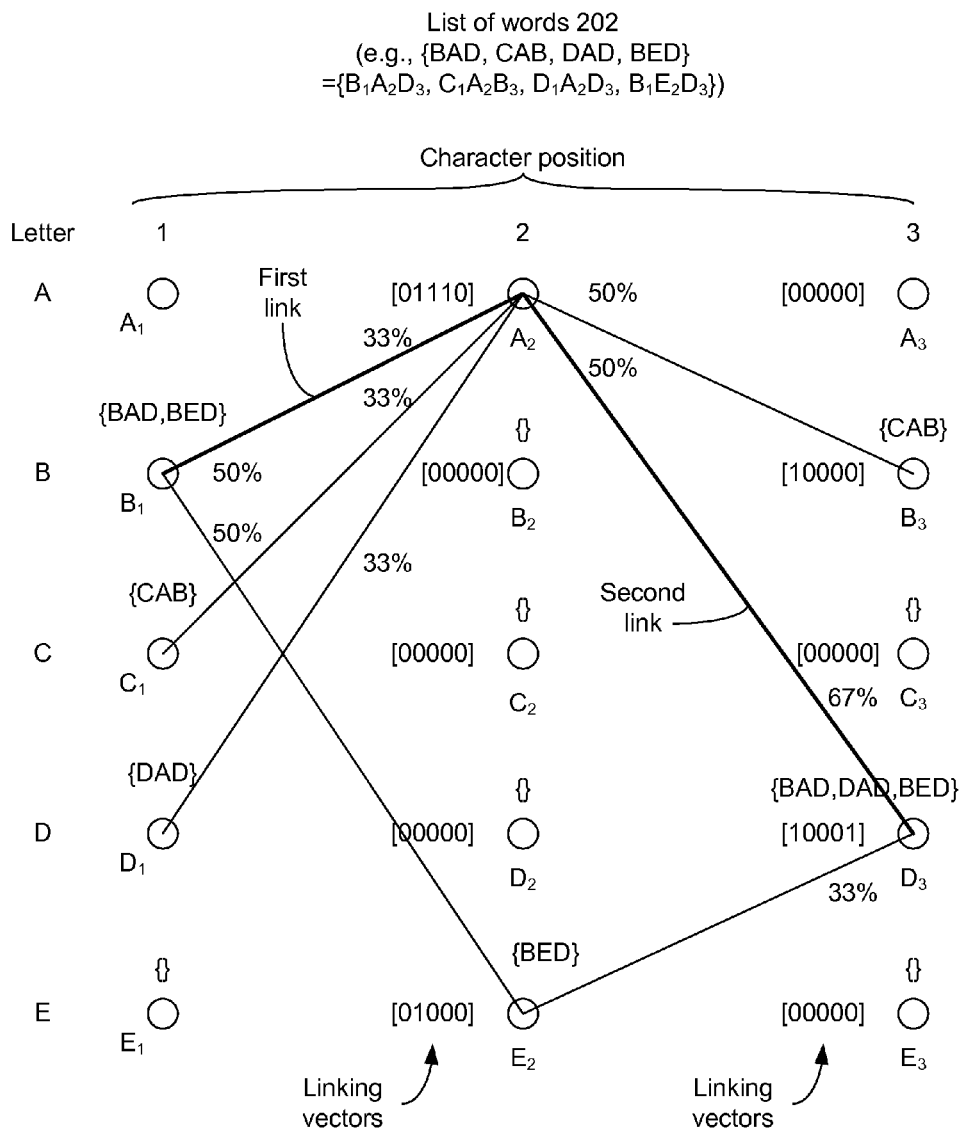
FIG. 4 illustrates constructing a trellis structure with an example list of words, in accordance with embodiments of the invention.

FIG. 4 illustrates constructing a trellis structure with an example list of words, in accordance with embodiments of the invention. During pre-processing, words are loaded into the trellis one at a time. A first stage contains a first letter (first column) of a loaded word, a second stage contains a second letter (second column), a third stage contains a third letter (third column), and so on. For example, the list of works consists of {BAD, CAB, DAD, BED}, which is shown as {$B_1A_2D_3$, $C_1A_2B_3$, $D_1A_2D_3$, $B_1E_2D_3$} when including column subscripts. A different trellis may be used for words of a different length.

The trellis loading process begins with a first word, for example, containing three letters. Either the letters may be individually loaded or links connecting two letters may be loaded. At a first stage, a first letter is read. For the first example word "BAD," a link from letter B at a first stage ($B_1$) to letter A as a second stage ($A_2$) is shown. A second link from $A_2$ to $D_3$ completes the path for the first example word "BAD." Therefore, the word "BAD" may be saved as two links: $B_1 \rightarrow A_2$ and $A_2 \rightarrow D_3$. The process continues with example words CAB, DAD and BED with corresponding links $C_1$ to $A_2$ and $A_2$ to $B_3$ for "CAB," $D_1$ to $A_2$ and $A_2$ to $D_3$ for "DAB," and $B_1$ to $E_2$ and $E_2$ to $D_3$ for "BED." In sum, for each node after the first column of nodes (i.e., representing a letter after the first letter position), an input linking vector is shown that identifies valid paths to that node.

Pre-processing may also compute probabilities associated with each node for entering and/or exiting the node. For the example given, node $B_1$ has an equal 50% probability between two links: $B_1 \rightarrow A_2$ and $B_1 \rightarrow E_2$. Similarly, node $A_2$ has an even probability from three links to enter node $A_2$ (shown as 33%) and from two links to exit node $A_2$ (shown as 50%). Node $D_3$ has a ⅔ probability (67%) of entering from a previous 'A' and a ⅓ probability (33%) of entering from a previous 'E.'

Words may be loaded into a trellis by creating input linking vectors as described above. During runtime, the input linking vectors are examined when checking for a valid link and possible valid paths. The input linking vectors may be created offline, for example, by a server during a pre-processing period. The input linking vector includes one bit for each character in the alphabet. For example for Roman letter, the length of the input linking vector may be 52 for 26 lower case letter and 26 upper case letters. The length may be increased to include 10 digits and various punctuation marks.

For Devanagari script, the length of the input linking vector may vary depending on the complexity of the system deployed. Devanagari vowels may be written independently or be used to modified a basic consonant with diacritical marks, which are written above, below, before or after the consonant they belong to. When a vowel modifies a basic consonant, the vowel is referred to as a "modifier." The character formed by modifying a basic consonant with a vowel is referred to as a "conjunct." When concatenating two or more consonant together, the new character is referred to as a "composite character" or a "compound character." Compound characters may include both basic consonants, modified consonants and half characters. Of the 33 consonants, 24 of them have half forms. Characters in a word are joined by a horizontal bar referred to as a "Shiro-rekha" or a headline. The many forms of compound characters lead to a large number of resulting characters, which make OCR of Devanagari script very difficult.

Considering Devanagari script, the length of the input linking vector may be 44 for the 44 basic characters: 33 consonant and 11 vowels. Alternatively, the length of the input linking vector may be increase to include 10 modifiers. Additionally, the length of the input linking vector may be increase to include 24 half characters. Considering 44 basic characters (33 consonant referred to as "vyanjan" and 11 vowels referred to as "svar"), 10 modifiers and 24 half characters, the length of the input linking vector may be 78. Again, the length may be increased to include 10 digits and various punctuation. The input linking vector may be made shorter by just including common characters and excluding infrequently used characters.

In this example, the input linking vector is length five. A first node in the second column (denoted as $A_2$ representing a letter 'A' in the second position of a word) is shown having an input linking vector [01110]. The input linking vector [01110] may be interpreted from the individual binary values '0' (which means a first link is not valid), '1' '1' '1' (the next three links are valid) and '0' (the last link is also not valid). A link may be considered valid if a word has a transition between a previous node and the current node. Nodes representing the letters B, C, and D have no valid input links so the vector is shown as [00000]. Only one valid input link is shown for $E_2$ (the final letter E in the second position in a word) from $B_1$; therefore, the node's vector is [01000], representing the only valid input link to $E_2$ is from $B_1$. For the final stage, representing a third letter in a word, input linking vectors are shown as [00000], [10000], [00000], and [00000], respectively for $A_3$, $B_3$, $C_3$, $D_3$ and $E_3$, representing transitions to that node in column 3 by the previous stage from column 2.

Also shown, a set of words includes a letter represented by each node. That is, a word-node set is computed while building the trellis to show what words pass through that particular node. For example, regarding the first stage (a first letter in a word) no word in the list of words 202 starts with $A_1$, so an empty set { } is shown. Two words start with $B_1$, which are shown as {BAD, BED}. One word starts with $C_1$, which is shown as {CAB}. Another word starts with $D_1$, which is shown as {DAD}. No word starts with $E_1$, so an empty set { } is shown. Regarding a second stage, three words contain $A_2$; therefore, the set is shown as {BAD, CAB, DAD}. No words contain $B_2$, $C_2$ or $D_2$ in the list of words 202; therefore, empty sets { } are shown. A single word includes $E_2$, so the set shows {BED}. For the final stage, letters $A_3$, $B_3$, $C_3$, $D_3$ and $E_3$ include sets { }, {CAB}, { }, {BAD, DAD, BED] and { }, respectively.

The process of building the trellis by creating the input linking vectors and word-node sets may be performed during a pre-processing period by the mobile device or alternatively by a remote server and downloaded to the mobile device.

FIGS. 5 and 6 illustrate word decoding based on OCR character probabilities, in accordance with embodiments of the invention. Each letter position includes a primary letter and associated probability and a secondary letter and its associated probability. Even though only primary and secondary letters and probabilities are shown, OCR character probabilities may expand to tertiary and quaternary or more possibilities.

FIG. 5 shows an output from an OCR unit (e.g., performed at 122), where a letter and its probability of being that letter are provided for each letter position. In this example, a character image 120 in a first position has a probability of 60% or 0.6 of being a letter B (shown as $B_1$). The first character image 120 in the first position also has a probability of 40% or 0.4 of being a letter D (shown as $D_1$). That is, the primary letter is a B with probability 0.6 and a secondary letter is a D with probability of 0.4. For a second position, a second character image 120 has a probability of 40% or 0.4 of being a letter $A_2$ and a probability of 60% or 0.6 of being a letter $D_2$. A third letter is shown having a probability of 30% or 0.3 of being a letter $B_3$ and a probability of 70% or 0.7 of being a letter $D_3$. The process works for an OCR unit that provides two letter possibilities (as shown here) or three, four or more letter possibilities. Two possible letters are shown to exemplify the process described herein.

FIG. 6 shows resulting links based on the link possibilities 210 (for pre-processing computed offline) for the example OCR unit output (set of characters 124) shown in FIG. 5. Possible links for the set of characters 124 are shown with dotted lines. Links with 'X' through the dotted line are not in the trellis or are removed from the trellis during pre-processing to indicate no word exists with that link. The set of characters 124 with corresponding probabilities is used to traverse the trellis.

In the example shown, $B_1$ is assigned a value of 0.6 and $D_1$ is assigned a value of 0.4 to correspond to the table in FIG. 5. The table shows a first character to second character transition may be $B_1 \rightarrow A_2$, $B_1 \rightarrow D_2$, $D_1 \rightarrow A_2$, and $D_1 \rightarrow D_2$, however, links $D_1 \rightarrow A_2$, and $D_1 \rightarrow D_2$ do not exist in the trellis. In this case, $D_2$ is a possible OCD decode but is an impossible letter for the second position based on the trellis. Therefore, these two links are removed from consideration. Next, $A_2$ is assigned 0.4 and $D_2$ is assigned 0.6. The table shows a second character to third character transition may be $A_2 \rightarrow B_3$, $A_2 \rightarrow D_3$, $D_2 \rightarrow B_3$, and $D_2 \rightarrow D_3$, however, links $D_2 \rightarrow B_3$, and $D_2 \rightarrow D_3$ do not exist in the trellis. Therefore, these links may be eliminated. The only valid links are $B_1 \rightarrow A_2$, $D_1 \rightarrow A_2$, $A_2 \rightarrow B_3$, and $A_2 \rightarrow D_3$ resulting in four valid paths ($B_1 \rightarrow A_2 \rightarrow B_3$, $B_1 \rightarrow A_2 \rightarrow D_3$, $D_1 \rightarrow A_2 \rightarrow B_3$, $D_1 \rightarrow A_2 \rightarrow D_3$) with four respective cumulative probabilities (0.6*0.4*0.3=7.2%, 0.6*0.4*0.7=16.8%, 0.4*0.4*0.3=4.8% and 0.4*0.4*0.7=11.2%). The best path is shown connecting valid links having the highest probabilities from FIG. 5, namely, the second path $B_1 \rightarrow A_2 \rightarrow D_3$ with cumulative probability of 16.8%.

Figure 7:
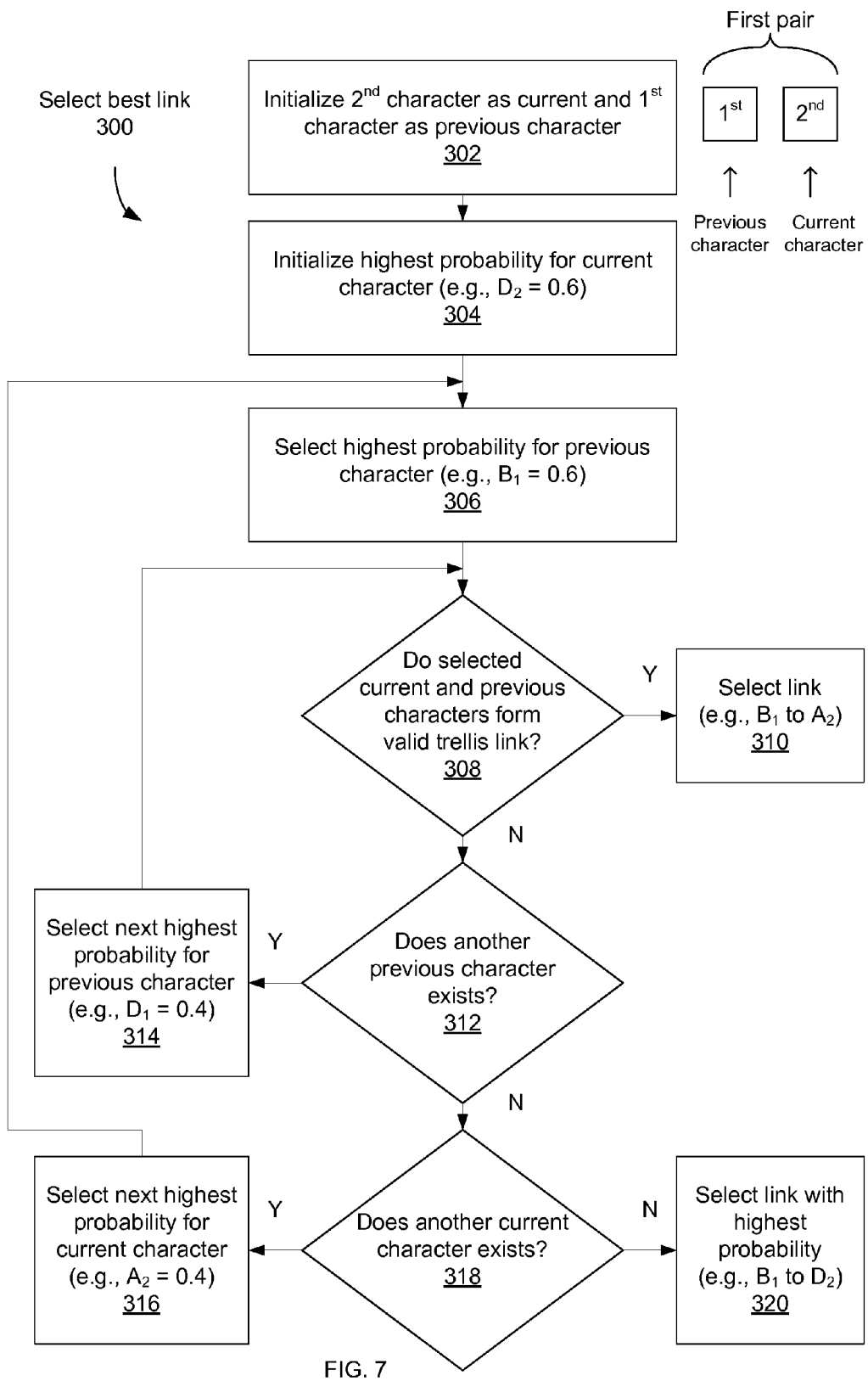
FIG. 7 shows method to select a best link in a path between a previous character and a current characte, in accordance with embodiments of the invention r.

FIG. 7 shows method 300 to select a best link in a path between a previous character and a current character, in accordance with embodiments of the invention. In this forward pass, a first pair of previous and current characters is the first character paired with the second character. A second pair is the second character pair with the third character and so one. Method 300 selects a best path (shown as the solid line in FIG. 6). Method 300 may be performed on the mobile device, on a server or a combination of both.

At 302, a processor considers a first pair of characters. The first pair of characters contains a first character and a second character represented as a previous character and a current character, respectively. That is, the current character is initialized from the second character and the previous character is initialized from the first character.

At 304, the processor finds the highest probability for the current character and initializes an end of a possibly selected link. In the example above, the current character is be $A_2$ with probability 0.4 and $D_2$ with probability 0.6. The previous character is be $B_1$ with probability 0.6 and $D_1$ with probability 0.4. Thus, the highest probability for the current character is $D_2$ with probability 0.6.

At 306, a beginning of an outer loop starts. The processor selects the highest probability for the previous character. In the example above, the highest probability for the previous character is $B_1$ with probability 0.6.

At 308, a beginning of an inner loop starts. The processor makes a determination whether the selected current character and the selected previous character form a valid link in the trellis. For example, the processor examines the appropriate input linking vector. In the example case, the input linking vector is [01010], which indicates that $B_1 \rightarrow A_2$ and $D_1 \rightarrow A_2$ are valid links. If the current and previous characters form a valid link from the trellis, processing continues at 310. If not, processing continues at 312.

At 310, if the link exists in the trellis, a link between the current and previous characters is selected as the best link. The process continues at 302 with new current and previous characters to find the next best link between the next stages.

At 312, if no link exists in the trellis, the process advances to examine the next highest probability as the previous character at 314 and then returns to 308. Otherwise, at 318, a check is made as whether next character exists and may be set as the current character. If a next character exists, the next highest probability for the current character is selected at 316, then the process continues at 306. At 320, if no possible links exist, then the process selects the first link (having the highest probability) even though the link is not in the trellis.

Figure 8:
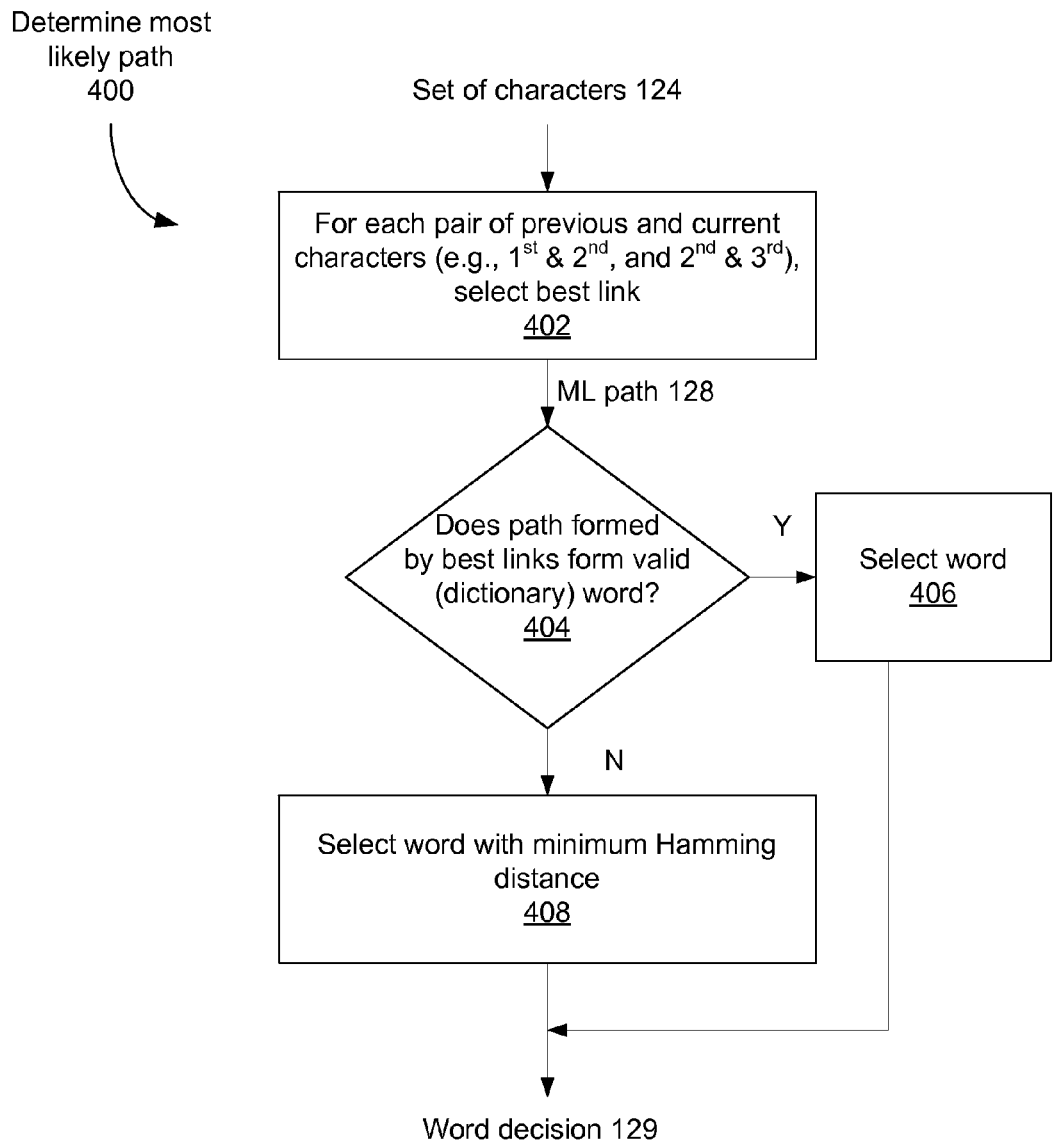
FIG. 8 shows a method to determine the most likely path through a trellis, in accordance with embodiments of the invention.

FIG. 8 shows a method 400 to determine the most likely path through a trellis, in accordance with embodiments of the invention. At 402, a processor accepts a set of characters 124. The best set of links is selected for each pair of previous and current characters. The best set of links is set as the one or more links from a previous OCR recognized character to each current OCR recognized character. At 404, a check is made to see of the ML path 128 from the best links forms a valid word from the list of words 206. If so, at 406, that word is selected as the word decision 129. If not, at 408, the word from the list of words 206 with the minimum Hamming distance is selected as the word decision 129.

Figures 9, 10:
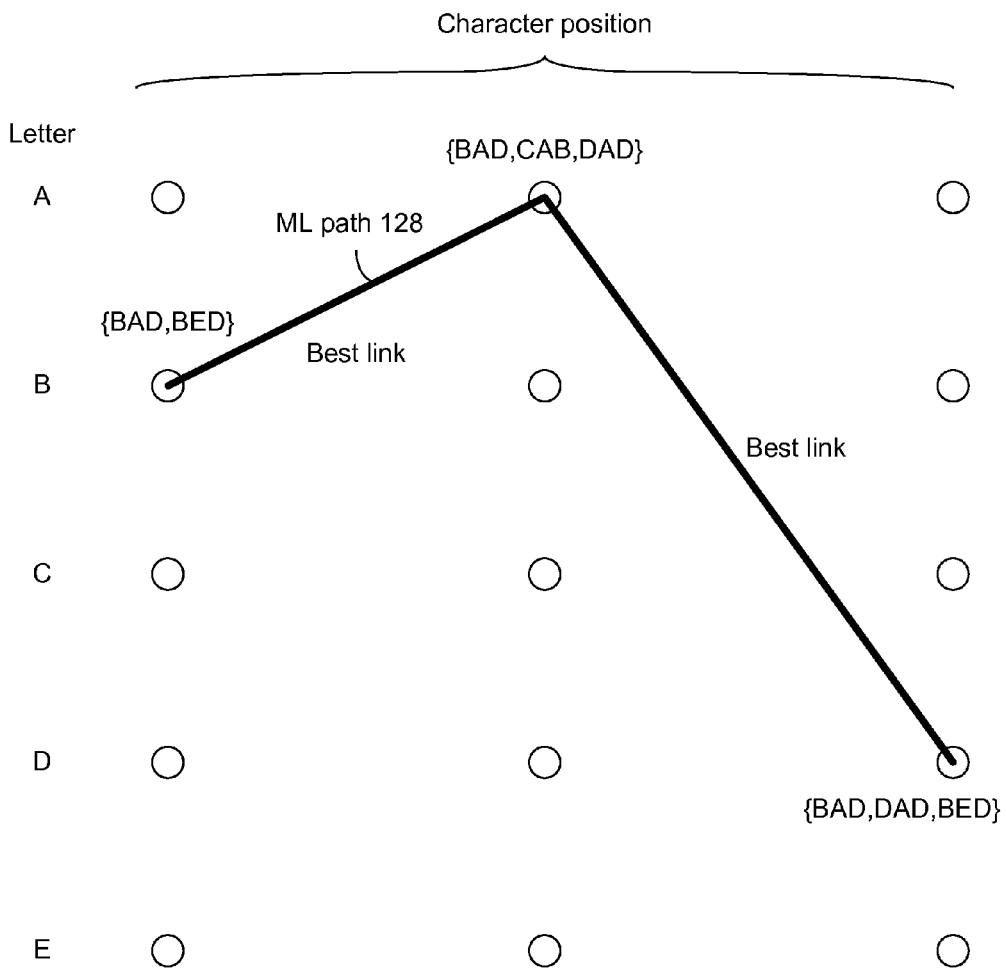
FIGS. 9 and 10 illustrate a calculation of a minimum Hamming distance, in accordance with embodiments of the invention.

FIGS. 9 and 10 illustrate a calculation of a minimum Hamming distance, in accordance with embodiments of the invention. To calculate the minimum Hamming distance, the word-node sets may be used. A word-node set is a set of all words that goes through a particular node. For example, a list of words 202 contains four words in its dictionary {BAD, CAB, DAD, BED}. A word-node set for the first position being a letter 'B' (or $B_1$) is {BAD, BED}.

FIG. 9 shows a most likely (ML) path 128. A counter exists for each possible word along the best path. In the example shown, a ML path 128 includes nodes $B_1 \rightarrow A_2 \rightarrow D_3$. For a first stage, a processor increments all words containing $B_1$ in the list of words 202. The ML path 128 from $B_1$ has words {BAD, BED} in the word-node set. Therefore, counters for BAD and BED are each set to one as shown in FIG. 10. Counters for other words in the list of words 202 are left at zero. The count is now BAD=1, CAB=0, DAD=0 and BED=0.

For the second stage, the word-node set {BAD, CAB, DAD} is shown along the best path. The counters for these words are incremented. The count is now BAD=2, CAB=1, DAD=1 and BED=1. Finally, the last stage passes through $D_3$. The word-node set includes {BAD, DAD, BED} for this node. Counters for these words are similarly incremented. The count is now BAD=3, CAB=1, DAD=2 and BED=2. The word having the highest count (e.g., BAD=3) is the word having the minimum Hamming distance to the best path. Therefore, the processor selects the word having the highest count as the selected word for this forward pass.

Figure 11:
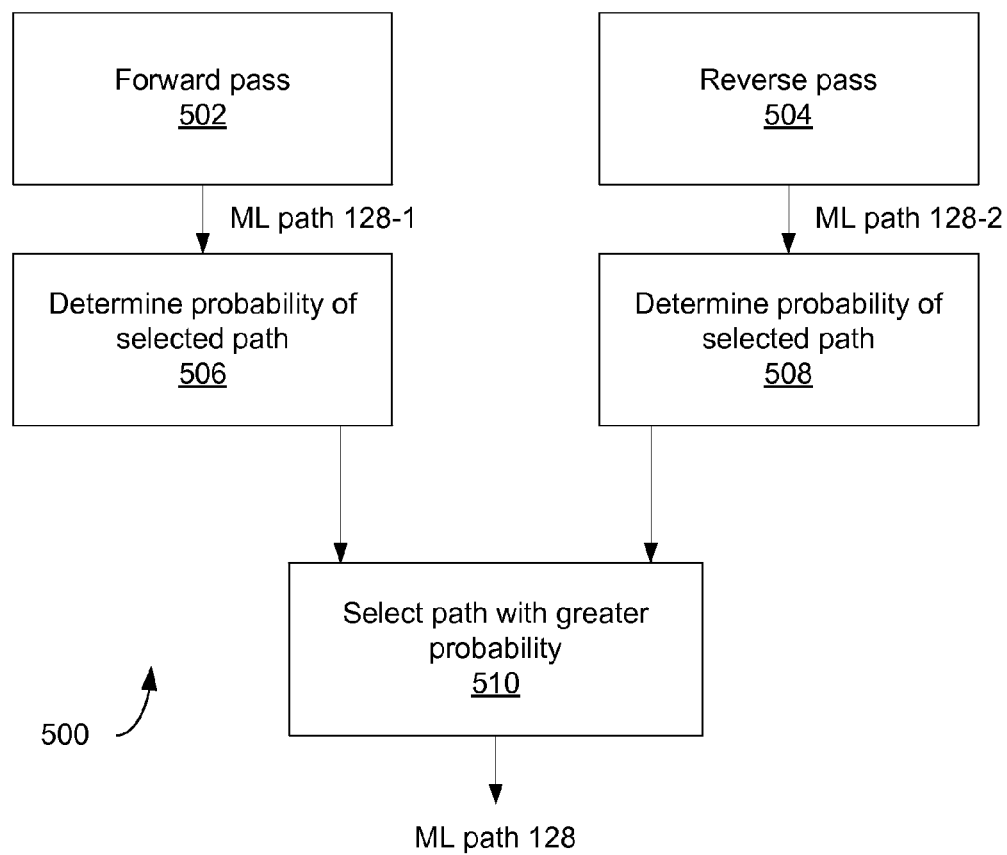
FIG. 11 shows a forward pass operating in cooperation with a reverse pass, in accordance with embodiments of the invention.

FIG. 11 shows a forward pass operating 500 in cooperation with a reverse pass, in accordance with embodiments of the invention. At 502, a processor performs a forward pass operation, as described above. During a forward pass, pre-processing creates a standard dictionary or list of words sorted from first character position to last character position. During operations, a processor determines a most likely forward path through the trellis. The processor then determines an ML path 128-1 from the forward trellis. At 506, the processor computes a probability of the selected path.

Similar to a forward pass, pre-processing may also create a reverse-order dictionary where a list of words 202 is sorted from last character position to first character position. At 504, the processor performs a reverse pass with the reverse-ordered list of words 202 to form an ML path 128-2 from the reverse trellis. At 508, the processor computes a probability of the selected path. At 510, the processor compares the probabilities from 508 and 508 and then selects the greater probability of the two paths as the ML path 128. In some test results with noisy images, a 5% improvement was found by adding a reverse pass to a forward pass system.

In the examples above, a simple form of the English language using an alphabet of five characters was used. The method may be expanded to a 26-character alphabet or to an alphabet that includes both upper and lower case letters, numbers and punctuation. In the examples below, Devanagari is used to illustrate the method for more complicated characters sets. Most North Indic scripts (e.g., the Devanagari script, also called Nāgarī, which is used in India and Nepal among other countries) are written from left to right, do not have distinct character cases, and are recognizable by a horizontal bar or line that runs along the top of characters. Devanagari script is commonly used to write standard Hindi, Marathi, Nepali and Sanskrit. The Devanagari script may be used for many other languages as well, including Bhojpuri, Gujari, Pahari, Garhwali, Kumaoni, Konkani, Magahi, Maithili, Marwari, Bhili, Newari, Santhali, Tharu, Sindhi, Dogri and Sherpa.

In Devanagari in general, modifiers (e.g., upper and lower modifiers) add a great deal of complexity to the basic character set due to the large variety. In fact, over a 1000 character combinations and contractions are possible. Currently, OCR systems have difficulty identifying works with such a complex set of character variations. An OCR system may be simplified to 100 characters, which is most commonly used, in the Devanagari alphabet.

In some embodiments, each word is considered as a sequence of characters with a unique identifier. As an example भारत (India) is represented as अ + ा + र + त . A dictionary of words is a list of valid words, where each word is represented as a sequence of characters (as shown in the example above). An OCR unit outputs one, two, three, four or more possibilities for each OCR character with their corresponding likelihood. An OCR character is a character recognized by an OCR system. The table of FIG. 5 shows two possible OCR characters for each set of characters 124. For some embodiments, any remaining probability can be equally divided among all the other characters in the list of words. Using the current techniques, a processor finds the most likely (valid) word from the list of words, given outputs from character decoder. A trellis based algorithm is used to compute the most likely word.

In some implementations, forward and reverse trellises may be created offline (away from a mobile device) during a pre-processing period. A list of words may be provided. The list of words can be processed from left to right to generate a forward trellis, and processed from right to left to generate a reverse trellis. The information indicative of the forward and reverse trellises can then be stored as a trellis database for later access.

In order to identify text included in image data, a candidate sequence of decoded characters 124 is identified (e.g., at the mobile device or a network resource such as a server). The candidate sequence is processed using a trellis based decoder, which accesses the trellis database. Additionally, a reverse candidate sequence is generated that includes the decoded characters 124 in reverse order, which is also processed using the trellis based decoder. Based on processing the candidate sequence and the reverse candidate sequence, the candidate sequence may be matched to a dictionary word having the highest confidence or highest probability. The "highest confidence" may be indicated by a confidence score, which may be the fraction of match between the winning or ML path 128 and the decoded word. In some implementations, if a match cannot be determined with a minimum confidence, the algorithm may provide an indication that the search has failed or is not reliable.

Figure 12:
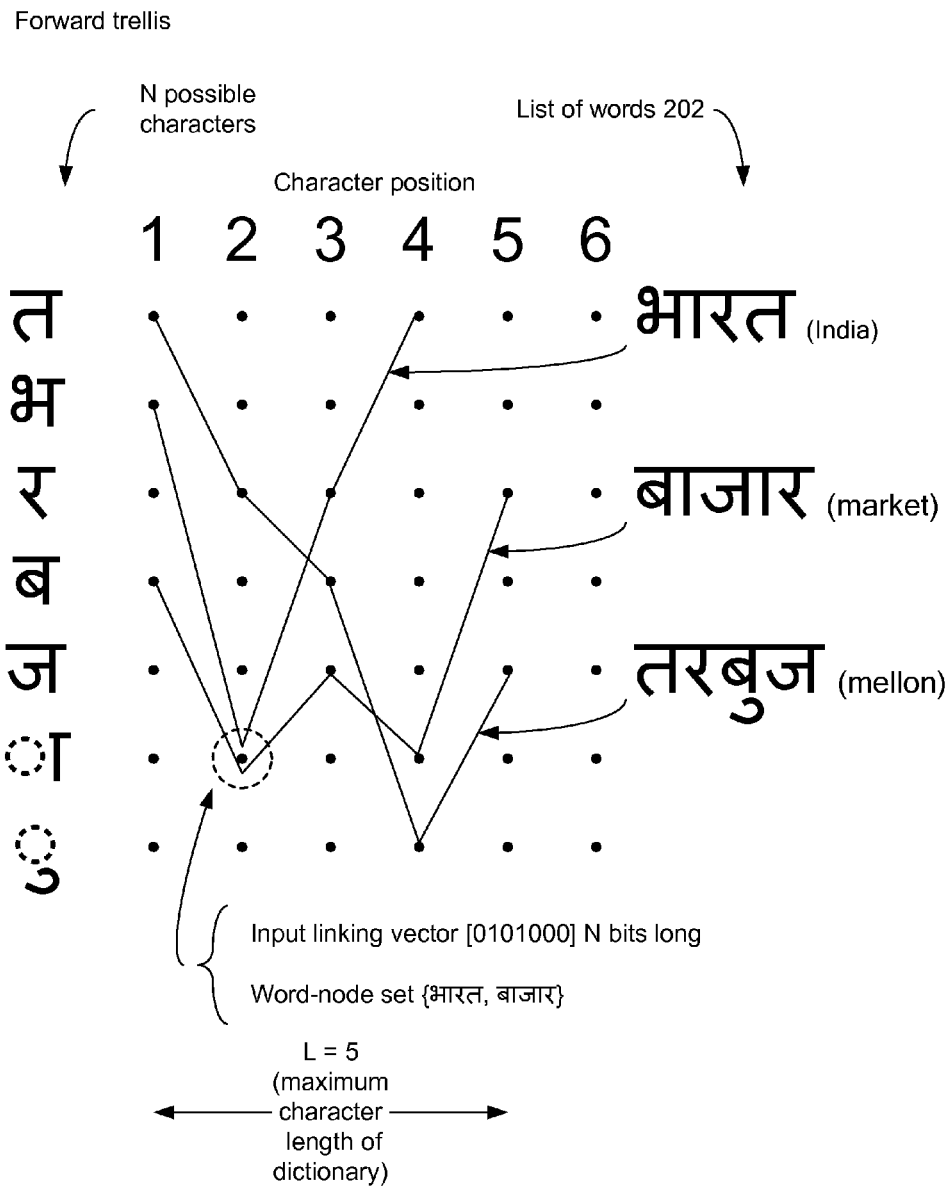
FIG. 12 shows an example of trellis construction, in accordance with embodiments of the invention.

FIG. 12 shows an example of trellis construction, in accordance with embodiments of the invention. In the following, N is the total number of character identifiers, L is the maximum number of characters in a word (for a given list of words), and W is the number of words in the list of words. In the example shown, N=7 (with characters ' '), L=5 (length of second and last word), and W=3 (with words भारत , बाजार and तरबुज ).

For each node of the trellis, the following two quantities may be maintained for pre-processing. First, a (binary) characteristic vector or input linking vector in N bits long and represents the list of characters from previous level connected to the node. For the node highlighted with a dotted circle, the input linking vector is [0101000]. Second, a list of words that visit the node in the trellis may be maintained as a word-node set. The node highlighted node contains two words { भारत , बाजार } passing through the node.

During runtime, the trellis structure may also contain a counter for each word at each character position. An OCR unit provides a set of decoded characters 124 and associated probabilities for matching within the trellis. The OCR unit may provide a single possible character for each position. Alternatively, the OCR unit provides multiple possible characters for each position along with an associated probability for each character. Passing a set of decoded characters 124 from the OCR unit through the trellis results in a best path. The word from the list of words that is closest to the ML path 128 is selected as the word decision.

Assume for this example an OCR unit provides three characters at each position. For the first character position, the OCR unit provides three possible characters and associated probabilities. For the second character position, the OCR unit provides another three possible characters with associated probabilities. Looking back from the second position to the first position, the link having the highest probability is saved for each of the possible second characters. That is, up to three links are saved. For each node in the second character position identified by the OCR unit, a link may be formed from each of the three possible characters from the first character position to the second character position. That is, the number of possibilities at each position is squared to determine how many possible links exist (e.g., $3^2=9$).

Instead of saving every link to between the positions, only the link with the highest probability is saved. For example, the first character position has possibilities of 0.7, 0.2 and 0.1 for the first, second and third positions of the first character positions, respectfully. The second character position has possibilities of 0.5, 0.3 and 0.2 for the first, second and third positions of the second character positions, respectfully. The different permutations from first to second character positions results in nine links: three links to the first node of the second position with link probabilities of (0.7*0.5=0.35, 0.2*0.5=0.10 and 0.1*0.5=0.05); three links to the second node of the second position with link probabilities of (0.7*0.3=0.21, 0.2*0.3=0.06 and 0.1*0.3=0.03); and three links to the third node of the second position with link probabilities of (0.7*0.2=0.14, 0.2*0.2=0.04 and 0.1*0.2=0.02).

Of the three links from nodes of the first position to the first node of the second position, only one link is saved. The saved link has the highest priority that is also a valid link in the trellis. If the highest priority link is an invalid link, it is discarded. Therefore, the link with the highest probability to the first node in the second position and found as a valid link from the input linking vector is saved. Similarly, the highest probability valid link to the second node in the second position determined from the input linking vector is saved. Finally, the link with the highest valid probability to the third node in the second position is saved.

If the highest probable link is determined to be an invalid link, the next highest probability is considered as long as it is a valid link. If also an invalid link, the next highest probability is considers and so on. If no valid links are found, the link with the highest probability is used.

As we progress from the first and second positions to the second and third positions, the same strategy of saving one link for each possible node (the highest valid link) is saved. We then progress to the next pair of positions and so on keeping track of the highest valid links and therefore, keeping track of a ML path 128 of entering into a node at the current level. At the final level, three paths are formed; one path into each OCR node. At this final stage, the node having the highest path likelihood is selected and referred to as the winning path, best path or most likely (ML) path. That is, the forward trellis process results in one winning path. Similarly, the reverse trellis also results in one winning path. The processor compares the likelihood of the forward path to the likelihood of the reverse path and selected the overall winning path as the ML path 128 having a higher likelihood between the two paths. Often the forward path and the reverse path are identical. In cases when they are different though, comparing the likelihoods and selecting the path with a greater likelihood as the ML path 128 improves performance over a system that only examines a single path.

Figure 13:
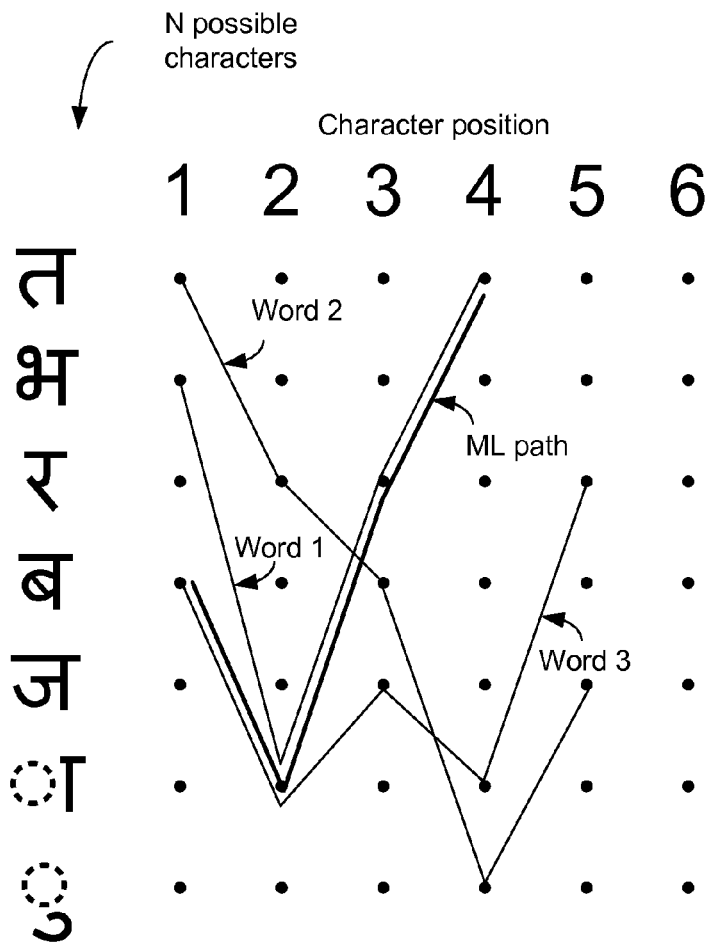
FIG. 13 shows an example of determining a minimum hamming distance, in accordance with embodiments of the invention.

There may be some issues with the ML path. For example, the final overall winning path may correspond to an invalid word (i.e., a word not in the list of words. As shown in FIG. 13, assume the case where the list of words contains three words: भारत , तरबुज and बाजार (or the characters <'भ' 'ा' 'र' 'त '>, 'त' 'र' 'ब' 'ु' 'ज '> and <'ब' 'ा' 'ज' 'ा' 'र '>, respectively). The processor finds the ML path 128 corresponds to बारत (or the characters <'ब' 'ा' 'र' 'र' 'त '>). In order to mitigate this issue, the Hamming distance may be computed for the ML path 128 with words that touch this path in the list of words. In this example, the Hamming distance for the first dictionary word is 1 (1 character differs and 3 of 4 characters correspond between the first word in the dictionary and the word formed along the ML path). The Hamming distance for the second and third dictionary words are 4 and 2, respectively. Therefore, the word along the ML path 128 ( बारत ) is closest to the dictionary word भारत with a minimum Hamming distance of 1. The word with the minimum Hamming distance may then be an output word.

Another issue is that the selected word could be longer than the input word. This happens when the initial segment of a longer word "matches" the path; e.g., if the input word is राज , the final word could be राजकुमार . This issue may be mitigated by imposing a length constraint on the output word.

As noted above, each word in the list of words is included in the reverse order, and another trellis is created (referred to as a reverse trellis). Upon receiving OCR output, we reverse the input string and search through the reverse trellis to obtain the most likely path. This step is referred to herein as the reverse pass.

If the reverse pass returns a word with higher confidence than the forward pass, then its output can be retained. If not, the output of the forward pass is retained. Note, in some embodiments the input string need not be completely reversed to create the reverse trellis. We can instead start somewhere in between, and traverse both forward and reverse to create the trellis.

The following process may be performed to incorporate a reverse pass in the word decoder. Each word in the list of words can be read in the reverse order and another trellis constructed. Upon receiving the OCR output, the input string can be reversed and the reverse trellis searched to obtain the ML path 128-2 (called "reverse pass"). As noted above, if the reverse pass returns a word with higher confidence than the forward pass, its output is retained. If not, the output of the forward pass can be retained.

Figure 14:
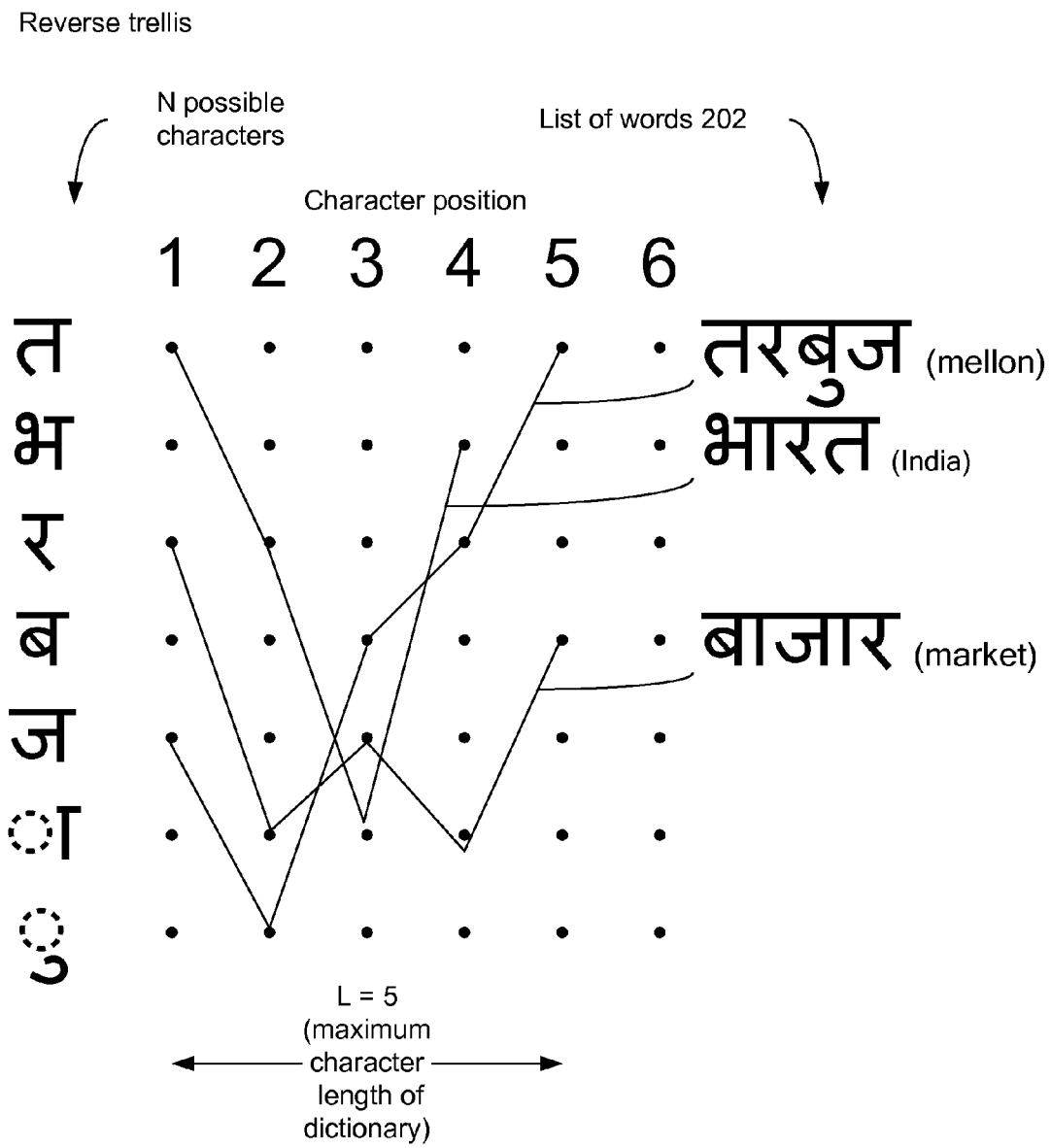
FIG. 14 shows an example of a reverse trellis, in accordance with embodiments of the invention.

As shown in FIG. 14, a reverse pass provides diversity (as the noise within character images may vary across the length), and hence may provide gain. The first word तरबुज (mellon) is reversed in order and saved in the trellis as <'त' 'र' 'ा' 'भ '>. Similarly, the second and third words are saved as <'ज' 'ु' 'ब' 'र' 'त '> and <'र' 'ा' 'ज' 'ा' 'ब '> respectively. The plurality of OCR characters are also reversed before the processor passes the characters through the reverse trellis.

Figure 15:
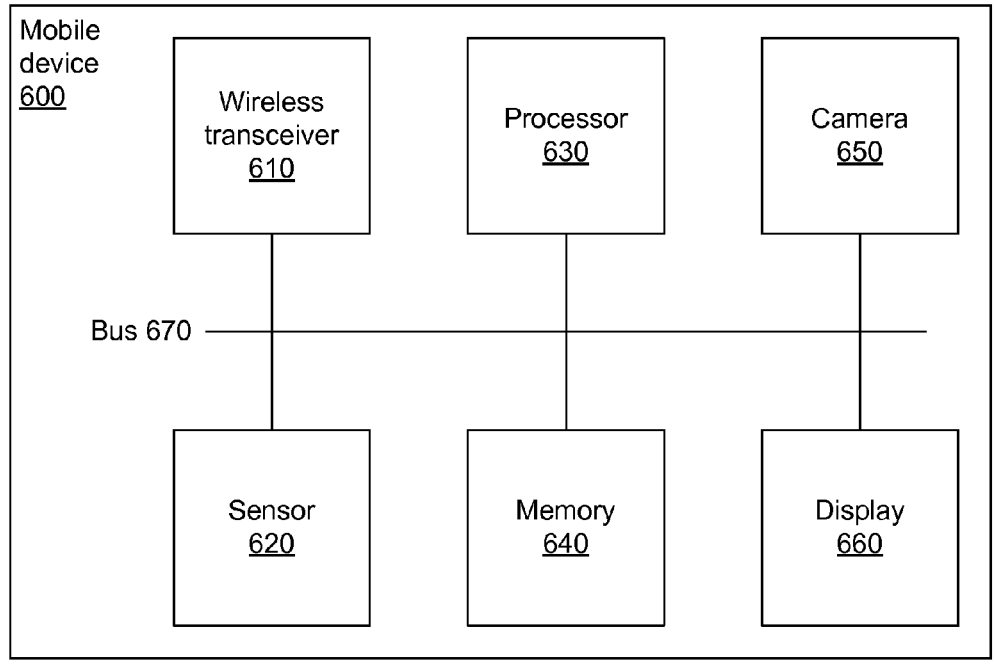
FIGS. 15 and 16 show a mobile device and a server, in accordance with embodiments of the invention.
Figure 16:
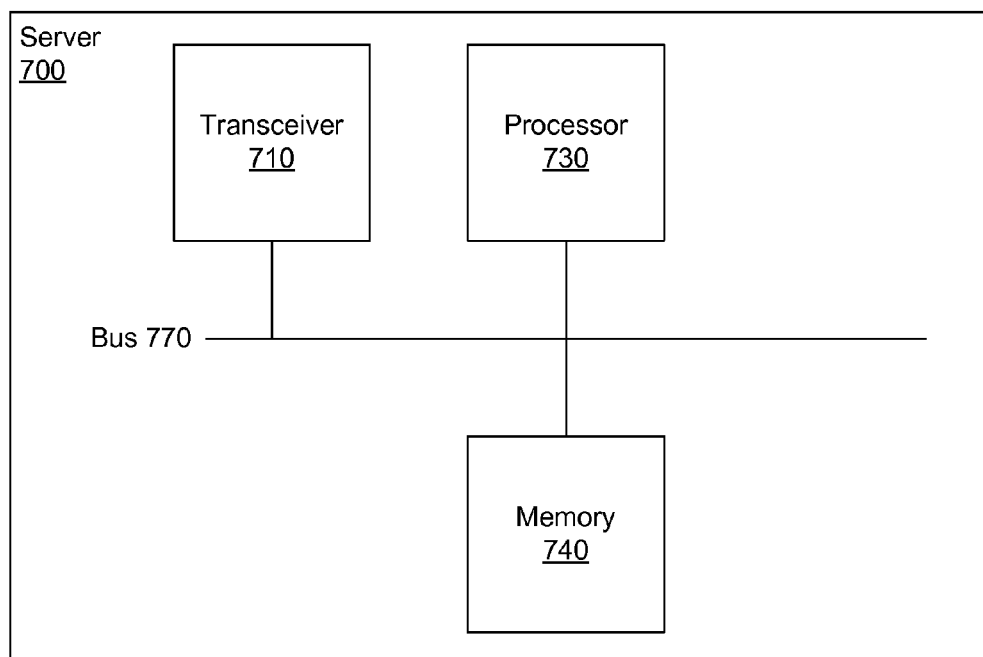

FIGS. 15 and 16 show a mobile device 600 and a server 700, in accordance with embodiments of the invention. In FIG. 15, the mobile device 600 includes an optional wireless transceiver 610, such as a cellular receiver and/or a WiFi transceiver. The mobile device 600 may also include a wired transceiver. The mobile device 600 may also contain a GNSS receiver, such as a GPS receiver. The mobile device 600 also includes an optional sensor 620, such as an accelerometer, a gyroscope and/or a barometer. The mobile device 600 also includes a processor 630, memory 640, a camera 650 and a display 660. The processor 630 and memory 640 contain software instructions or code to perform the methods performed on a mobile device described herein. The camera 650 captures images for the processor 630 to perform OCR. The display 660 shows the results from the processor 630. A bus 670 couples these components together. Some components may connect directly together without using the bus 670.

In FIG. 16, the server 700 includes a transceiver 710, a processor 730 and memory 740 communicating over bus 770. The transceiver 710 communicates to the mobile device 600 via the Internet and/or with a wired or wireless transceiver. The processor 730 and memory 740 contain software instructions or code to perform steps and methods performed on a server describe herein. A bus 770 couples these components together. Components may connect directly together without using the bus 770.

Various wireless communication networks based on infrared, radio, and/or microwave technology can be used to implement described techniques. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more exemplary embodiments, the functions and processes described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method to relate images of words to a list of words in an optical character recognition (OCR) system, the method comprising:
   receiving a plurality of OCR characters corresponding to an image of a word, wherein the plurality of OCR characters are from an OCR system;
   determining a most likely (ML) path based on the plurality of OCR characters applied to a loaded forward trellis and a loaded reverse trellis, thereby forming a decoded word; and
   displaying the decoded word.

2. The method of claim 1, wherein the list of words comprise a Devanagari list of words.

3. The method of claim 1, further comprising:
   capturing and extracting the image of the word form a captured image to form an extracted word;
   segmenting the extracted word into character images;
   recognizing the plurality of OCR characters from the character images; and
   providing the plurality of OCR characters.

4. The method of claim 1, wherein the plurality of OCR characters comprises a single decoded character for each character position.

5. The method of claim 1, wherein the plurality of OCR characters comprises multiple characters for each character position and a corresponding likelihood of each character for the character position.

6. The method of claim 1, further comprising pre-processing comprising:
   accessing the list of words;
   loading a forward trellis using the list of words to form the loaded forward trellis; and
   loading a reverse trellis using the list of words to form the loaded reverse trellis.

7. The method of claim 6, further comprising forming a linking vector that indicates valid and invalid links into a node.

8. The method of claim 6, further comprising, for each node in the forward trellis and the reverse trellis having a previous character position entering the node, forming a linking vector that indicates valid and invalid links into the node.

9. The method of claim 6, further comprising, for each node in the forward trellis and the reverse trellis having a previous character position entering the node, forming a set of words indicating which words from the list of words have a path through the node.

10. The method of claim 6, wherein loading the reverse trellis comprises, for each word in the list of words:
    selecting a word from the list of words; and
    loading the reverse trellis at:
      a first character position with a final character;
      a second character position with a second to the final character; and
      a third character position with a third to the final character.

11. The method of claim 1, further comprising receiving the loaded forward trellis and the loaded reverse trellis.

12. The method of claim 1, further comprising:
   receiving the loaded forward trellis loaded with the list of words in a forward-position order; and receiving the loaded reverse trellis loaded with the list of words in a reverse-position order.

13. The method of claim 1, further comprising converting the plurality of OCR characters from a Unicode to a character identifier (char ID) to form a plurality of char IDs, wherein determining the ML path based on the plurality of OCR characters comprises determining the ML path based on the plurality of char IDs.

14. The method of claim 1, wherein determining the ML path comprises:
   determining at least one forward path through the loaded forward trellis;
   determining at least one reverse path through the loaded reverse trellis; and
   selecting, as the ML path, from the at least one forward path and the at least one reverse path, having a highest likelihood.

15. The method of claim 14, wherein the at least one forward path through the loaded forward trellis comprises multiple paths through the loaded forward trellis.

16. The method of claim 14, wherein determining the at least one forward path through the loaded forward trellis comprises:
   determining a link from a previous character position to a current character position is invalid from the loaded forward trellis; and
   discarding the link from the previous character position to the current character position based on the link being invalid in the loaded forward trellis.

17. The method of claim 14, wherein determining the at least one forward path through the loaded forward trellis comprises:
   determining a link from a previous character position to a current character position is valid from the loaded forward trellis; and
   saving the link from the previous character position to the current character position based on the link being valid in the loaded forward trellis.

18. The method of claim 14, wherein determining the at least one forward path through the loaded forward trellis comprises:
   accessing a linking vector for a node in a current character position;
   wherein the linking vector indicates valid and invalid paths into the node.

19. The method of claim 1, wherein an ML word formed along the ML path is not in the list of words, the method further comprising:
   finding a word from the list of words having a minimum distance to the ML word; and
   updating the ML word with the word from the list of words.

20. The method of claim 19, wherein finding the word from the list of words having the minimum distance to the ML word comprises finding the word from the list of words having a minimum Hamming distance to the ML word.

21. The method of claim 1, further comprising translating an ML word, formed along the ML path, from a first language to second language.

22. The method of claim 1, further comprising concatenating an ML word, formed along the ML path, with other words determined from their respective ML path.

23. A mobile device to relate images of words to a list of words in an optical character recognition (OCR) system, the mobile device comprising:
   a camera configured to capture an image of a word;
   a processor coupled to the camera, the processor comprising code to:
      receive a plurality of OCR characters corresponding to the image of the word; and
      determine a most likely (ML) path based on the plurality of OCR characters applied to a loaded forward trellis and a loaded reverse trellis, thereby forming a decoded word; and
   a display coupled to the processor and configured to display the decoded word.

24. The mobile device of claim 23, wherein the list of words comprise a Devanagari list of words.

25. The mobile device of claim 23, wherein the plurality of OCR characters comprise a single character for each character position.

26. The mobile device of claim 23, wherein the plurality of OCR characters comprise multiple characters for each character position and a corresponding likelihood of each character for the character position.

27. The mobile device of claim 23, further comprising a linking vector that indicates valid and invalid links into a node.

28. The mobile device of claim 23, further comprising a set of words indicating which words from the list of words have a path through a node.

29. The mobile device of claim 23, further comprising the loaded forward trellis and the loaded reverse trellis.

30. The mobile device of claim 23, further comprising a minimum Hamming distance module to find a word from the list of words having a minimum Hamming distance to an ML word, formed along the ML path.

31. A mobile device to relate images of words to a list of words in an optical character recognition (OCR) system, the mobile device comprising:
   means for receiving a plurality of OCR characters corresponding to an image of a word, wherein the plurality of OCR characters are from an OCR system;
   means for determining a most likely (ML) path based on the plurality of OCR characters applied to a loaded forward trellis and a loaded reverse trellis, thereby forming a decoded word; and
   means for displaying the decoded word.

32. The mobile device of claim 31, wherein the list of words comprise a Devanagari list of words.

33. The mobile device of claim 31, wherein the plurality of OCR characters comprise a single character for each character position.

34. The mobile device of claim 31, wherein the plurality of OCR characters comprise multiple characters for each character position and a corresponding likelihood of each character for the character position.

35. The mobile device of claim 31, further comprising a linking vector that indicates valid and invalid links into a node.

36. The mobile device of claim 31, further comprising a set of words indicating which words from the list of words have a path through a node.

37. The mobile device of claim 31, further comprising the loaded forward trellis and the loaded reverse trellis.

38. The mobile device of claim 31, further comprising a minimum Hamming distance module to find a word from the list of words having a minimum Hamming distance to an ML word, formed along the ML path.

39. A device to relate images of words to a list of words in an optical character recognition (OCR) system, the device comprising a processor and a memory wherein the memory includes software instructions to:

receive a plurality of OCR characters corresponding to an image of a word, wherein the plurality of OCR characters are from an OCR system;

determine a most likely (ML) path based on the plurality of OCR characters applied to a loaded forward trellis and a loaded reverse trellis, thereby forming a decoded word; and display the decoded word.

40. A non-transitory computer-readable storage medium including program code stored thereon, for a method to relate images of words to a list of words in an optical character recognition (OCR) system, comprising program code to:

receive a plurality of OCR characters corresponding to an image of a word, wherein the plurality of OCR characters are from an OCR system;

determine a most likely (ML) path based on the plurality of OCR characters applied to a loaded forward trellis and a loaded reverse trellis, thereby forming a decoded word; and display the decoded word.

41. The non-transitory computer-readable storage medium of claim 40, wherein the list of words comprise a Devanagari list of words.

42. The non-transitory computer-readable storage medium of claim 40, wherein the plurality of OCR characters comprise a single character for each character position.

43. The non-transitory computer-readable storage medium of claim 40, wherein the plurality of OCR characters comprise multiple characters for each character position and a corresponding likelihood of each character for the character position.

44. The non-transitory computer-readable storage medium of claim 40, further comprising program code to interpreted a linking vector that indicates valid and invalid links into a node.

45. The non-transitory computer-readable storage medium of claim 40, further comprising program code to form a set of words indicating which words from the list of words have a path through a node.

46. The non-transitory computer-readable storage medium of claim 40, further comprising program code to receive the loaded forward trellis and the loaded reverse trellis.

47. The non-transitory computer-readable storage medium of claim 40, further comprising program code to find a word from the list of words having a minimum Hamming distance to an ML word, formed along the ML path.

48. A mobile device to relate images of words to a list of words in an optical character recognition (OCR) system, the mobile device comprising:

means for accessing the list of words;

means for loading a forward trellis using the list of words to form a loaded forward trellis; and means for loading a reverse trellis using the list of words to form a loaded reverse trellis.

49. The mobile device of claim 48, wherein the list of words comprise a Devanagari list of words.

50. The mobile device of claim 48, further comprising means for forming a linking vector that indicates valid and invalid links into a node.

51. The mobile device of claim 48, further comprising, for each node in the forward trellis and the reverse trellis having a previous character position entering the node, means for forming a linking vector that indicates valid and invalid links into a node.

52. The mobile device of claim 48, further comprising, for each node in the forward trellis and the reverse trellis having a previous character position entering the node, means for forming a set of words indicating which words from the list of words have a path through the node.

* * * * *